Nov. 16, 1937.　　　　D. D. MYERS　　　　2,099,274
AUTOMOBILE LIFT
Filed Oct. 28, 1935　　　2 Sheets-Sheet 1
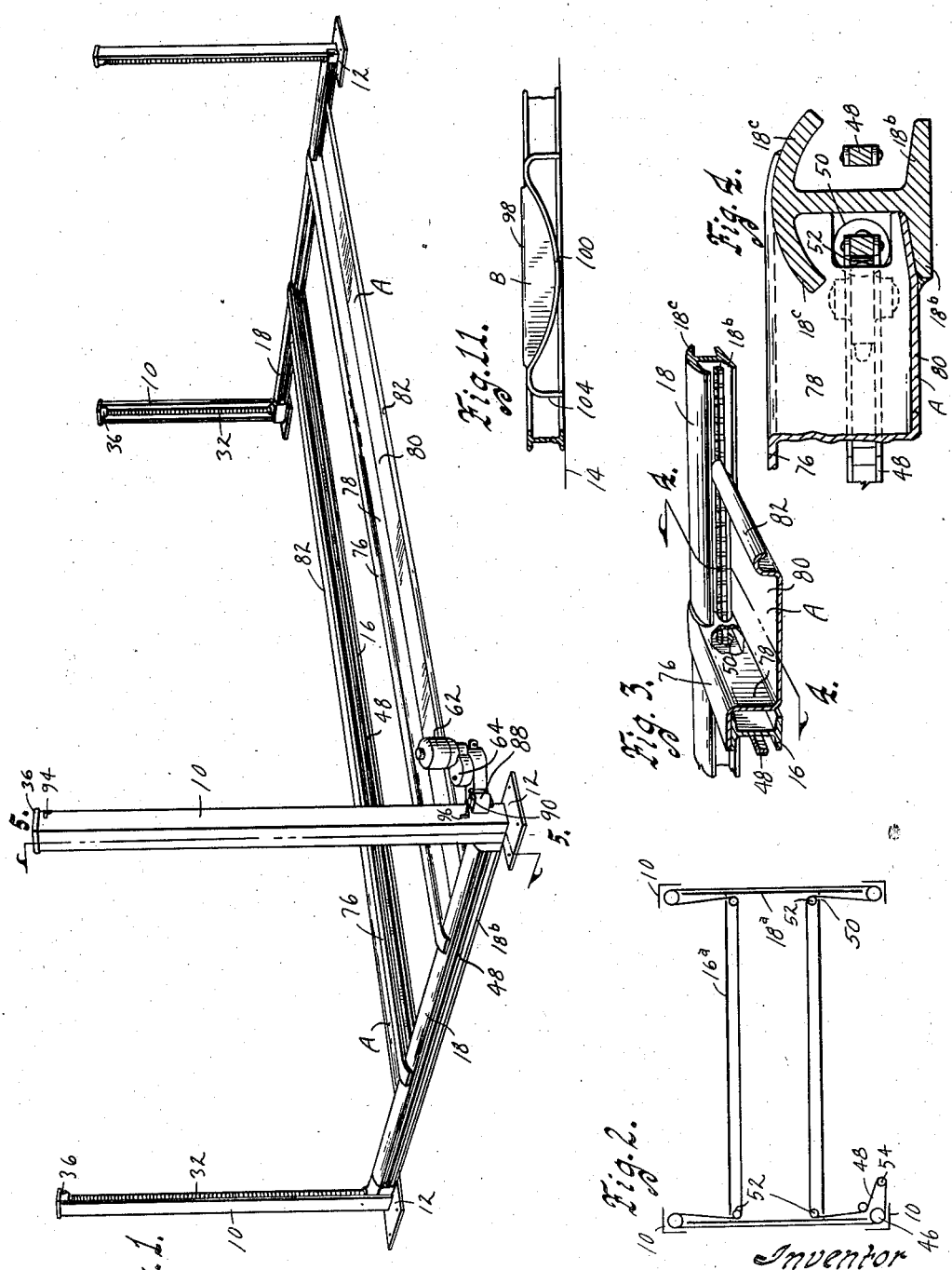
Inventor
Don D. Myers
by Bair, Freeman & Sinclair
Attorneys
Witness
H. S. Mengenmaier

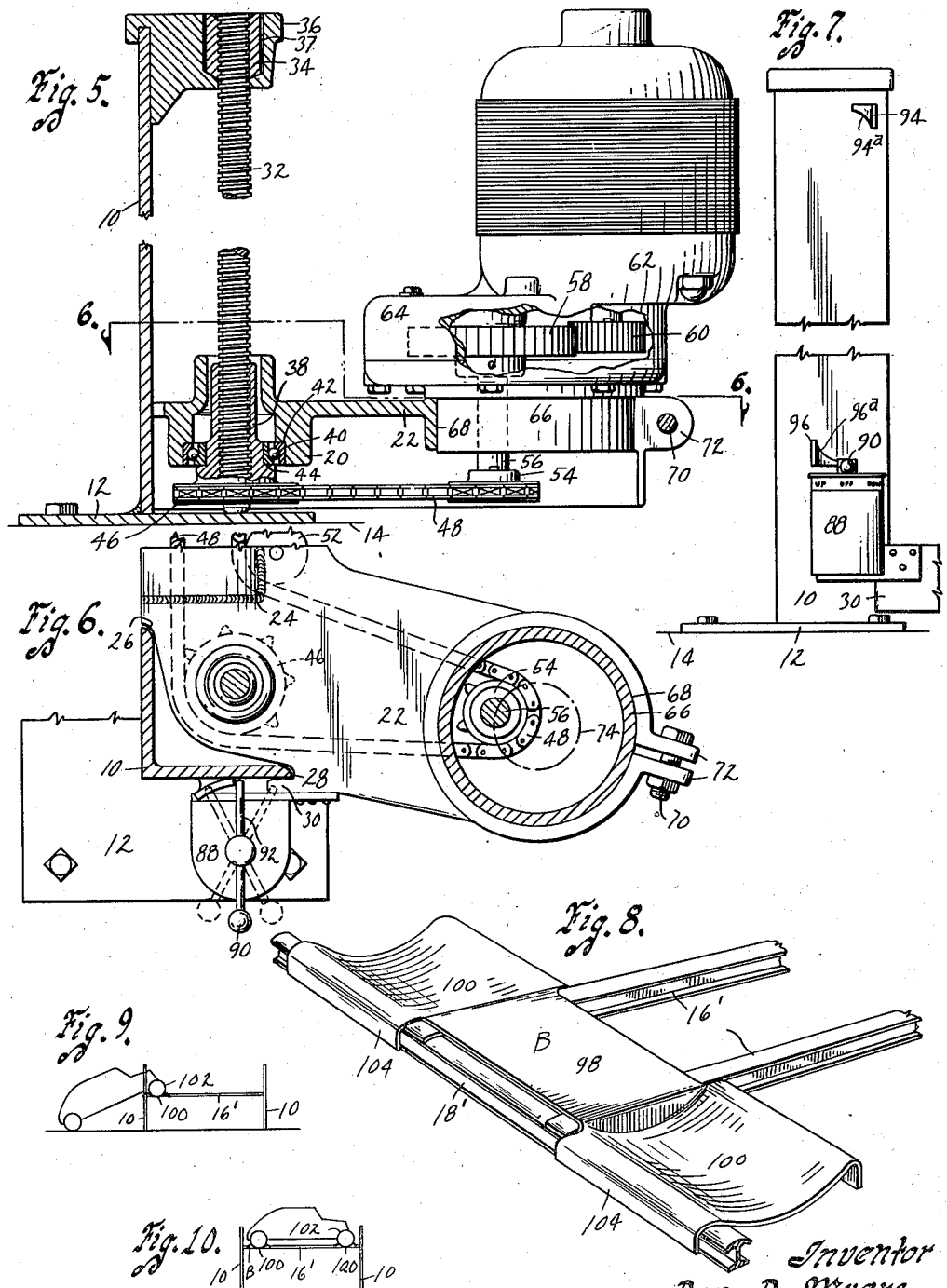

Patented Nov. 16, 1937

2,099,274

UNITED STATES PATENT OFFICE 2,099,274

AUTOMOBILE LIFT

Don D. Myers, Toledo, Ohio, assignor to Modern Equipment Corporation, Defiance, Ohio, a corporation of Ohio Application October 28, 1935, Serial No. 47,137

4 Claims. (Cl. 254—92)

An object of my invention is to provide a lift structure for automobiles or the like of the multiple post type in which a plurality of pairs of posts are mounted on a garage floor or the like and a carriage frame is vertically movable relative to the posts, the carriage frame having rails or flanges to engage the wheels of an automobile to lift the automobile thereby when vertical movement is imparted to the carriage frame.

A further object is to provide the carriage frame in the form of transverse beams and longitudinal beams connecting the transverse beams, flange elements being carried by the beams and arranged along the sides of the longitudinal beams for engaging the wheels of an automobile.

A further object is to provide the transverse beams of special cross section, the upper surface thereof being rounded to facilitate the driving of an automobile across the transverse beams to position the automobile over the longitudinal beams.

Another object is to provide means for moving the carriage comprising screw threaded shafts supported by the posts, nuts to rotate on the screw threaded shafts and the nuts in turn supporting the carriage frame and a motor driven chain extending along the beams from one sprocket to another for simultaneously rotating the nuts.

Another object is to provide the transverse beams of I shape so that the stretches of chain can extend between the flanges thereof, the upper flanges being curved downwardly to protect the chain against contact with the wheels of an automobile when driven thereover and to facilitate rolling of the automobile wheels over the transverse beams.

Still another object is to provide a control means for the motor driven chain consisting of a reversing switch which can be manually positioned for either raising or lowering the carriage frame, automatic stopping means being provided for throwing the switch to inoperative position when either the upper or lower limit of movement is reached.

Still another object is to provide a saddle member for a "free wheel" type of lift which is cooperable therewith for either raising one end of the automobile or converting the free wheel lift into a "drive on" type.

With these and other objects in view my invention consists in the construction, arrangement and combination of the various parts of my device whereby the objects contemplated are attained, as hereinafter more fully set forth, pointed out in my claims and illustrated in the accompanying drawings, in which:

Figure 1 is a perspective view of an automobile lift embodying my invention.

Figure 2 is a diagrammatic plan view of the same showing the arrangement of a chain for driving the lifting sprocket nuts of the lift.

Figure 3 is an enlarged perspective view of the joint between one of the drive on longitudinal rails and one of the transverse beams.

Figure 4 is an enlarged sectional view on the line 4—4 of Figure 3 showing the cross sectional shape of the transverse beam and the coaction of an automobile wheel supporting flange member therewith.

Figure 5 is a sectional view on the line 5—5 of Figure 1 showing details of construction of the driving mechanism for the chain and the lifting mechanism for the carriage frame.

Figure 6 is a plan view, partly in section on the line 6—6 of Figure 5.

Figure 7 is a front elevation of the near corner post in Figure 1 showing automatic control means for the motor switch.

Figure 8 is a perspective view illustrating the saddle member for converting a free wheel type of lift to a drive on type of lift.

Figure 9 is a diagrammatic side elevation showing the saddle of Figure 8 being used to raise one end only of an automobile.

Figure 10 is a similar diagrammatic view showing two of the saddles used for entirely supporting an automobile by engaging the wheels thereof; and Figure 11 is a side elevation of the longitudinal rail of a free wheel type of lift showing an end view of the saddle member when associated therewith.

On the accompanying drawings, I have used the reference numeral 10 to indicate a post of angular cross section. I have illustrated two pairs of the posts 10, although any number of pairs may be used, depending on the desired length of the lift. Each post 10 has a plate-like foot 12 thereon adapted to rest or be bolted against a garage floor or the like 14 (see Figure 5).

The posts 10 are unconnected, except by a carriage frame comprising longitudinal rails 16 and transverse rails 18. Each end of each rail 18 is provided with a guide casting 20. These castings are similar with the exception of the one at the near corner, which has an extension 22. The casting 20 may be secured as by welding 24 to the ends of the beams 18. Each of the castings 20, as best shown in Figure 6, has a pair of grooves 26 and 28 adapted to be guided by the edges of the flanges of the angle-like posts 10. One of the grooves preferably terminates in a hook-like flange 30.

Between the flanges of each post 10, I provide a stationary screw threaded shaft 32, the upper end of which is welded in a nut 34. The nut 34 is in turn carried by a cap member 36 on the post 10 having an annular socket 37 to supportingly and non-rotatably receive the nut 34. The nut serves merely as a suspending and connecting means between the threaded shaft 32 and the upper end of the post 10. The lower end of the shaft 32 may engage the foot plate 12 if desired for additional support.

On each shaft 32 I provide a rotatable nut 38 which obviously upon rotation will travel either up or down longitudinally of the shaft, depending on its direction of rotation. The nuts 38 through thrust ball bearings 40 support the castings 20, the bearings being received in sockets 42 thereof and resting on shoulders 44 of the nuts 38.

Each nut 38 is provided with a sprocket wheel 46 whereby the nuts may be rotated by actuation of the chain 48 passing around the nuts. The chain 38 is continuous, extending around each sprocket 46 as shown diagrammatically in Figure 2 and over idlers 52 located at the junctions of the carriage beams 16 and 18. The webs of the longitudinal and transverse beams 16 and 18 are indicated at 16a and 18a in Figure 2 and the webs 16a are provided with perforations 50 as shown in Figure 3 for the chain to extend through.

The chain 48 also extends around a drive sprocket 54 mounted on a shaft 56. The shaft 56 is driven as through a gear 58 and a pinion 60 by a reversible electric motor 62.

The motor 62 is supported on the housing 64 for the the gears 58 and 60. The housing 64 has a cylindrical projection 66 fitting snugly in a bore 68 of the casting extension 22. The shaft 56 is located eccentrically relative to the cylinder 66 as shown in Figure 6 whereby the cylinder may be rotated for tightening the chain 48 after it becomes worn. The adjustment may be retained by a clamping bolt 70 extending through perforated ears 72 on opposite sides of a split in the casting extension 22. Upon loosening this bolt the entire motor and gear casing can be rotated to secure the necessary chain adjustment. The arc of adjustment is indicated at 74 in Figure 6, the minimum adjustment being illustrated in this figure.

Wheel engaging members A are provided for the longitudinal beams 16. The members A are made of heavy sheet metal or boiler plate and have flanges 76, 78, 80 and 82. The flanges 76 rest on top of the beam 16 while the flanges 78 depend therefrom so that the outwardly extending flanges 80 may rest on the floor 14 when the lift is in lowered position. The flanges 82 are for reinforcing purposes while the flanges 80 are for engaging the wheels of an automobile for lifting the automobile when the carriage frame is raised.

The transverse beams 18 are preferably I shaped in cross section, although they have a peculiar inverted "anchor" shape as shown in Figure 4. The lower flanges are indicated at 18b and the upper flanges at 18c.

The flanges 18c, it will be noted, are inclined or curved downwardly, thus retaining the strength of the I beam but rounding the upper surface so as to facilitate the driving of the automobile wheels across the transverse beams when driving the automobile to a position for being lifted by the lift.

The flanges 18c by bending downwardly also protect the chain 48 from contact with the wheels of the automobile. The ends of the flanges 76 of the supporting members A rest on the flanges 18c and are welded or otherwise secured thereto while the ends of the flanges 80 rest on the flanges 18b of the transverse beams. This permits effective support for the wheel supporting flanges 80 adjacent the beams 18 where such support is especially needed when the automobile wheels roll off the beams during the positioning operation. This construction of the beams 18 eliminates the necessity of providing ramps for the automobile when driving it over the beams.

For controlling the motor 62, I provide a switch 88 having a control handle 90. As shown by dotted lines in Figure 6 when this handle is swung toward the left the motor 62 rotates in the proper direction for raising the lift. When swung toward the right, the motor rotates in the reverse direction while when the lever is in the central position (full line position) the motor is de-energized.

The handle 90 has an extension 92 adapted to cooperate with actuating lugs 94 and 96 at the top and bottom of the nearest post 10 in Figure 1. The lugs 94 and 96 have inclined or cam shaped lower and upper faces respectively as shown at 94a and 96a in Figure 7. When the lever 90 is swung toward the left for causing the lift to raise the extension 92 will swing toward the right into the path of the cam surface 94a adjacent the upper limit of movement of the lift. The extension 92 will engage the cam surface 94a thus automatically swinging the lever 90 to the center or "off" position. Likewise at the lower limit of movement, the cam surface 96a swings the lever to the center or "off" position. Thus a simple means is provided for automatically stopping the lift at either limit of its movement.

The posts 10, it will be noted, are entirely independent of each other except that they are connected by the threaded shafts and castings 20 to the carriage frame. Thus it is unnecessary to provide any stationary connecting frame at the tops of the posts which would be an inconvenient obstruction inasmuch as the carriage frame as it rises serves as a means to retain the posts 10 in proper position relative to each other and in a rigid supporting position for the carriage frame.

The motor and all operating parts for the lift are carried by the carriage frame and the control switch is likewise carried by the carriage frame. This considerably simplifies the construction of the machine without sacrificing any mechanical advantages inherent in a lift of the kind in which the motor is mounted stationary relative to the posts. Since screw threaded shafts are provided, the chain 48 can operate at a considerable speed without producing excessive lifting speed of the lift itself. The use of screw threaded shafts also makes the lift self locking in any position in which it is stopped.

In Figure 8 I illustrate a free wheel lift having longitudinal beams 16' and transverse beams 18'. The saddle is indicated generally as B and comprises a central plate 98 having flanges 100 at its ends which are dished so as to retain the wheels 102 of an automobile therein against rolling out of the flanges when the wheels are once positioned therein.

The forward and rearward edges of the flanges 100, indicated at 104, are bent downwardly to fit over the beams 18' to reinforce the forward and rearward edges of the wheel supporting flanges 100 and to rest on the surface 14 as shown in Figure 11 when the lift is in its lowered position.

One of the saddles B may be used as shown in Figure 9 for but one end of the automobile.

If it is desirable to convert a free wheel lift into a drive on type, two of the saddles B may be used as shown in Figure 10. The flanges 104 of the saddle are rounded at their upper outer corners to facilitate rolling of the automobile wheels onto the flanges 100.

Some changes may be made in the construction and arrangement of the parts of my device without departing from the real spirit and purpose of my invention and it is my intention to cover by my claims any modified forms of structure or use of mechanical equivalents which may be reasonably included within their scope.

I claim as my invention:

1. In a lift structure, a vertically movable carriage frame including a transverse beam and free wheel rails and a saddle for support on said rails, said saddle having laterally extending flanges for engaging the wheels of an automobile, said flanges being dished in a fore and aft direction and resting on said transverse beam and being thereby reinforced against bending when under load.

2. In a lift structure, a vertically movable carriage frame including free wheel rails and a transverse beam and a saddle for support on said rails, said saddle having flanges supported partially by said transverse beam for engaging the wheels of an automobile.

3. In a lift structure, a vertically movable carriage frame including free wheel rails and a transverse beam, and a saddle for support on said rails, said saddle comprising a cross member for positioning on said rails and flanges at the ends thereof for engagement with the wheels of an automobile, said flanges having downturned front and rear edges, one of which is hooked over said transverse beam.

4. In a lift structure, a vertically movable carriage frame including free wheel rails and a transverse beam, a saddle for support on said rails, said saddle comprising a cross member for positioning on said rails and flanges at the ends thereof for engagement with the wheels of an automobile, said flanges having downturned front and rear edges, one of which is hooked over said transverse beam and the portion of said flange intermediate said edges being depressed for receiving the wheels of an automobile and preventing them from rolling off over said edge.

DON D. MYERS.